United States Patent [19]

Meudec

[11] 3,957,942
[45] May 18, 1976

[54] PROCESS OF COATING AN ELONGATED SUPPORT

[75] Inventor: Henri Meudec, Paris, France

[73] Assignee: Rol, Auxerre, France

[22] Filed: Jan. 2, 1974

[21] Appl. No.: 429,840

Related U.S. Application Data

[60] Continuation of Ser. No. 220,522, Jan. 24, 1972, abandoned, which is a division of Ser. No. 12,639, Feb. 19, 1970, abandoned.

[30] Foreign Application Priority Data
Feb. 20, 1969 France .......................... 69.04362

[52] U.S. Cl. ............................... 264/235; 264/173; 264/275
[51] Int. Cl.² ........................................... B29F 3/10
[58] Field of Search ........... 264/173, 174, 235, 275; 425/113, 380

[56] References Cited
UNITED STATES PATENTS

| | | | |
|---|---|---|---|
| 2,928,123 | 3/1960 | Ramsey | 425/113 |
| 3,029,476 | 4/1962 | Merck et al. | 264/174 |
| 3,030,623 | 4/1962 | Lehti et al. | 264/174 |
| 3,045,281 | 7/1962 | Skobel | 425/113 |
| 3,249,670 | 5/1966 | Rottner et al. | 264/209 |
| 3,320,635 | 5/1967 | Zolotarevsky | 118/405 |
| 3,538,207 | 12/1966 | Toole | 425/113 |

FOREIGN PATENTS OR APPLICATIONS
624,699   6/1949   United Kingdom

*Primary Examiner*—Donald J. Arnold
*Assistant Examiner*—James B. Lowe
*Attorney, Agent, or Firm*—Stevens, Davis, Miller & Mosher

[57] ABSTRACT

A method of extruding a coating or sheath onto an elongated support which comprises radially feeding the material into an inlet end of an extrusion head and decompressing, homogenizing, decompressing and compacting the material around a sleeve which surrounds the support. Then the material is expanded radially and then deposited in the form of a sheath on the elongated support. The plastic material flows under pressure and the sheath moves toward the exit pulling with it the elongated support on which it is deposited. In the final portion of the extrusion head the sheath is guided and pressed onto the support to form a homogeneous coating of predetermined thickness. The coated articles may have a tubular or rectangular profile or be in the form of ribbons, wires, or cables, and particularly coated cylinders which may be solid or hollow.

3 Claims, 4 Drawing Figures

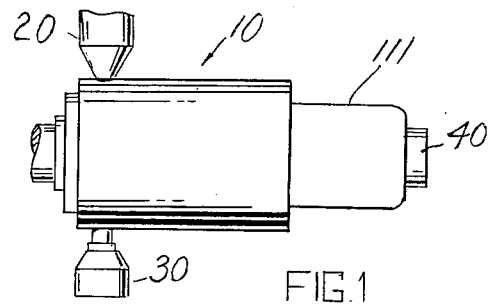
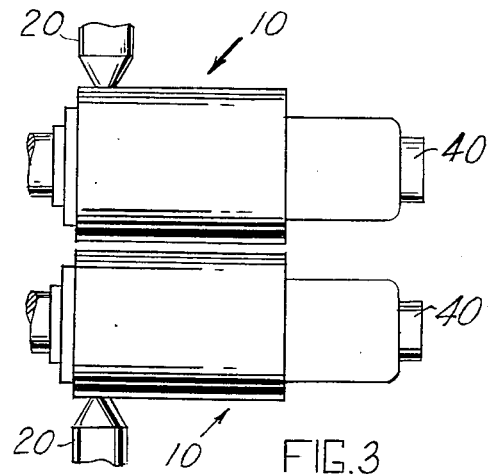
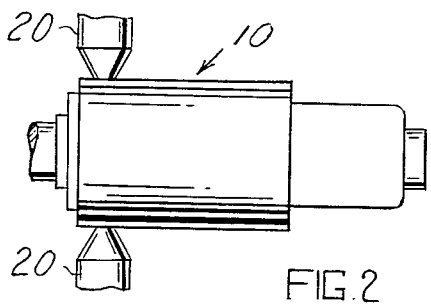
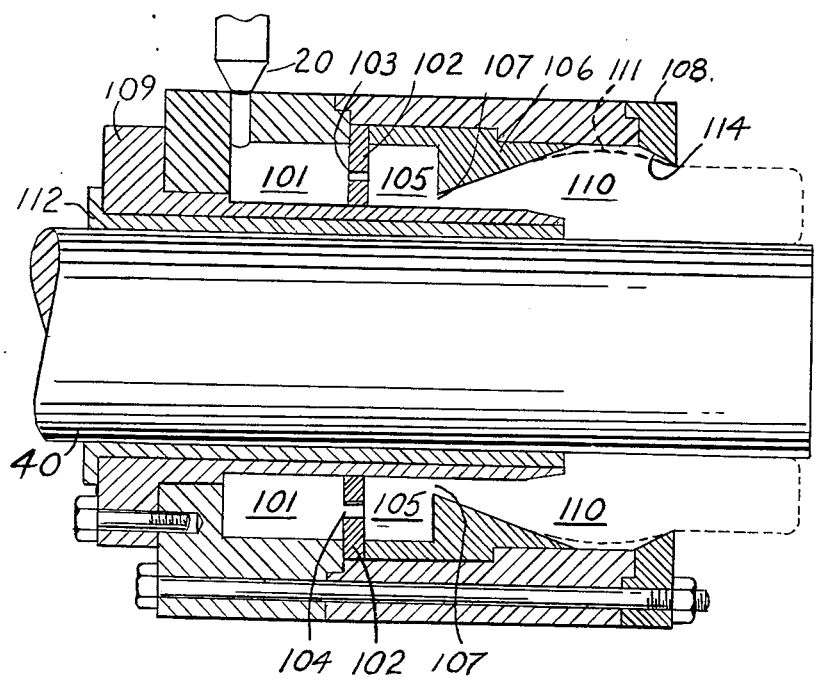

though the apparatus is shown as 3,957,942 related content:

PROCESS OF COATING AN ELONGATED SUPPORT

This is a continuation of U.S. Ser. No. 220,522, filed Jan. 24, 1972, now abandoned which is in turn a division of U.S. Ser. No. 12,639, filed February 19, 1970, now abandoned.

The present invention relates to a novel process for depositing a plastic material onto a support. More particularly, it relates to the preparation of rubber-coated rolls and to an apparatus whereby this is accomplished.

The term "plastic" as used herein refers in general to a polymeric material which is yieldable under stress and includes unvulcanized rubber compounds, heat softened thermoplastics and plasticized resins.

One of the previously known processes consists of surrounding a cylinder to be coated with a sheet of unvulcanized rubber of desired thickness, freshening with a solvent the overlapping surfaces to be joined, gluing the sheet to the cylinder, supporting coated cylinder with bands of textile to tighten the whole in place, and vulcanizing the rubber coating in an autoclave. In another process, the rubber is applied to the cylinder as a band wound spirally about the cylinder surface, and the thus coated cylinder placed in an autoclave to cure the rubber coating. These processes produce rubber rolls in which joints frequently show up as defects. Another process consists of preforming a hollow rubber sleeve which is then threaded onto the metal cylinder to be coated; this latter process is of little use industrially for it is limited to the preparation of rolls of small diameter and to rolls having a coating of reduced thickness.

The present invention is aimed at a process of coating an elongated support with a plastic material without the formation of an overlap joint. Another object of the invention is to provide an apparatus which comprises a means for homogenizing and even coating of the support with the plastic material. Yet a further object is the provision of improved industrial products such as coated supports and in particular rolls comprising a coating of plastic material.

These and other objects are provided by a process for coating a support with a plastic material comprising the steps of:

a. feeding under a pressure said material into the front end of an elongated hollow apparatus having an elongated support centrally inserted in axial position, b. homogenizing and distributing said material in the periphery within said apparatus, c. depositing said material on said support whereby a sheath is formed, and, d. while moving said support with the sheath deposited thereon towards the exit end of the apparatus, directing said sheath onto said support to form a coating of predetermined thickness.

In another aspect, the invention relates to an apparatus for coating a support with a plastic material comprising an elongated body shell having at the front end a first opening for the substantially radial introduction of said plastic material and a second opening for the axial introduction of an elongated support, and at the other end, a third opening for the axial exit of the coated support; said shell containing in coaxial relationship:

a. a first decompression zone,
b. a homogenizing means,
c. a second decompressing zone, and
d. a guiding means;

the first decompression zone being an annular chamber defined by the walls of said shell and encircling said support and being in communication with said first opening; the second decompression zone being an annular chamber separated from the first zone by said homogenizing means; said homogenizing means comprising a collar-like structure having a plurality of constricting passageways for homogenizing and distributing said plastic material in the periphery of the support; said second zone communicating with an exit through an annular orifice and peripheral guiding means for forming and guiding a compacted coating of desired thickness onto said support.

In yet a further aspect the invention relates to improved industrial products coated according to the present process; the products may be in the form of coated articles having tubular or rectangular profile, ribbons, wires, cables, and so on, particularly coated cylinders which may be solid or hollow.

The invention will be described with reference to the appended drawings showing a preferred form of coating apparatus. FIGS. 1, 2 and 3 represent diagrammatically the installation of an apparatus and FIG. 4 represents a sectional view of an apparatus for coating.

The apparatus according to the invention as represented in the figures has a cylindrical form and is open at its two extremities for the entry and exit of the support to be coated; it contains a series of zones in the form of annular chambers through which the rubber passes. This apparatus has an elongated body shell, the wall of which resists the pressure under which the coating material is introduced, which pressure may be about 100 kg/cm² or more. A plunger-type or screw-type polymer injection device may be used for the introduction of plastic material.

The apparatus of the present invention, as designated on the figures by reference 10, is directly connected to the head 20 of the polymer injection device. To counterbalance the pressure exerted by the injection machine on the apparatus, opposite to the entry from this injection machine one can place either a jack 30 as represented on FIG. 1, or another injection machine as shown by the arrangement in FIG. 2, or a combination of two injection machines each with the attached apparatus 10 according to the invention as represented on FIG. 3, or any other equivalent installation which ensures the stability of the apparatus during the operation.

With reference to FIG. 4, the preferred apparatus of the invention has in a downstream direction (with relation to the movement of the cylindrical support 40) a first decompression chamber 101 of annular form encircling the support. This chamber 101 is connected directly to the injection head 20, and the passage of plastic material takes place through a homogenizing means 102. This homogenizing means is in the shope of a collar-like structure encircling the support and is coaxial with the chamber 101 and is practically an extension of the latter.

This collar-shaped homogenizing means 102 contains a number of passageways 103, 104 through which the plastic material flows. The passageways are preferably of various diameters. The essential function of this means 102 is to homogenize and to distribute the output from the injection machine in the periphery of the support to be coated. Thus in FIG. 4, there is shown a passageway 103 of small diameter at the top part, near to the injection head, and a passageway 104 of larger diameter at opposite side, away from the injection head. While the dimensions of the passageways of the homogenizing means 102 may vary, the aggregate effect of their diameters may be determined experimentally and is a function of the type of plastic material used for coating. Once the type of the plastic material, e.g. a rubber compound to be used for coating is chosen, the conditions of temperature and pressure are practically fixed allowing only slight variations. The rate of flow of plastic material may then be adjusted by adjusting the size or number of constricting passageways through homogenizing means 102. In a particularly useful variation, the homogenizing means 102 consists of two collar-like parts, each having passageways of large and small dimensions and at least one part being radially displaceable with respect to the other, as by eccentric rotation. By rotating one collar-like part the size of the passageways is narrowed or enlarged or the distribution in the periphery is changed as desired without dismantling the apparatus to change said homogenizing means.

At the exit from homogenizing means 102, the plastic material is distributed as strings along the circumference of a second decompression chamber 105 which is also of annular form and encircles the cylindrical support 40; the annular chamber 105 is coaxial with the chamber 101 and the homogenization means 102, and practically is an extension of the latter, as shown on FIG. 4. This chamber 105 is delimited as by the wall of an outflow cone 106 which with sleeve shell 109 forms a constriction 107 in the form of an annular orifice through which the plastic material exits preferably in the form of a compact sheath. Dashed line 111 represents the polymer coating.

Finally, there is at the exit of the apparatus a guiding means 108, for example a positioning cone; its function is to guide and direct the extruded sheath towards the axis of the apparatus. This means 108 is detachable and of a dimension and shape which is dependent on the particular positioning effect desired.

The cylindrical support 40 is maintained coaxially within the apparatus; for that purpose, it is inserted into a sleeve 110 having a bore of a size and a cross-section to fit the elongated support 40 and to permit the sliding motion of said support. The sleeve is inside a tubular insert 109 having at the front end a flange by means of which the insert is secured to the front end of apparatus 10. The insert 109 extends into the apparatus past the second decompression zone 105 through homogenizing means 102 fitting into the collar-like structure of the latter so that the decompression zones 101 and 105 are effectively separated and the plastic material has to pass through passageways 103 and 104. Sleeve 110 is detachable and can be replaced by another one having a different size or cross-section to fit a different support. It is also possible to dispense with the insert 109 and to use an apparatus in which the insert 109 and sleeve 110 form an integral part. At the point where the sleeve 110 and insert 109 end and the compacted sheath is deposited directly on the support 40, the support is seized by the sheath moving under pressure toward the exit end of the apparatus and pulled thereby in the same direction.

In operation then the process according to the invention comprises pressure injecting the plastic coating material into a first decompression chamber 101; causing the thus decompressed material to move through a homogenizing means 102, thereby distributing the thus homogenized material uniformly along the whole periphery of the support 40; transforming the strings of material flowing out of the means 102 into a sheath in a second decompression chamber 105; compacting the sheath and controlling the thickness of the sheath by forcing it through the constriction 107 of a predetermined dimension and through the guiding means 108 directing the rubber sheath towards the support 40 whereby the sheath is firmly pressed onto the support to form a coating of a desired thickness and the thus coated support emerges from the exit of the apparatus. The coated support may the, if desired, be vulcanized and subjected to finishing operations such as buffing.

The present invention offers a number of advantages over previously known techniques. It permits the use of various polymers or blends thereof in a single apparatus having exchangeable homogenizing means. It also permits the use of a single apparatus for coating cylindrical objects of various diameters by simply changing a metal sleeve. The process also permits the elimination of solvents otherwise necessary to freshen surfaces of the coating to be adhesively joined. These solvents are often dangerous to the health of the personnel and to the safety of the premises.

The plastic material to be injected and employed as the coating may be one or more of a variety of polymeric materials which can be caused to flow under applied stress. Thus the material may be a rubber, natural or synthetic, usually in the form of a compound; it includes copolymers of butadiene/styrene, butadiene/acrylonitrile, polybutadiene, polyisoprene, butyl rubber, acrylate rubber, halogen-containing rubber, silicone-type rubber, polyurethane rubber, and so forth. The compounding of the rubber with fillers, curatives, and other ingredients is well known, as is the vulcanizing of such compounded rubber. The plastic material employed in this invention may also be based on resins not requiring vulcanization; they include thermoplastic polymers such as poly(vinyl chloride), a polymer of styrene, polyethylene and propylene, as well as phenolic resins or polyester resins.

Further advantage of the process according to the invention is in that the support may be precoated with an adhesive and the adhesive is not lost in the process of depositing the plastic material. Also of interest is the fact that the operator can see the object as soon as it is coated, and therefore can stop or modify the operation as soon as a defect is noticed. This avoids the waste of expensive coating materials. It is also possible in the present process to pass the same cylindrical support several times through the apparatus in the event one desires to apply two or more successive coatings on a given support.

The output of the apparatus for coating is dependent on that of the injection feeding machine. With the present apparatus operating continuously, one may achieve remarkable rates of production. For example, a cylindrical support measuring 25 millimeters in diameter and 370 millimeters in length as coated in 31 seconds to an external diameter of 52 millimeters with a rubbery compound.

This process produces non-porous coatings which are substantially free of surface defects and voids because of the successive decompression treatments of the plastic compound thereby yielding coated rolls of greater service life. This is important in such applications as inking, varnishing, printing, paraffining, calendering, and so on. For example, employing coatings of identical mixture, it was demonstrated that the mechanical properties of a vulcanized coating produced according to the present invention were distinctly superior to those of coatings as prepared by conventional methods.

What we claim is:

1. A process of coating an elongated support with a plastic material selected from vulcanizable rubber compounds, heat softened thermoplastic polymers or plasticized resins which comprises the steps of:
   a. radially feeding under pressure said material into an inlet end of an elongated extrusion head having an exit end and having an elongated support centrally inserted in axial position;
   b. sequentially decompressing, homogenizing, decompressing again, compacting while uniformly distributing said material around a sleeve surrounding the periphery of said support within said extrusion head;
   c. then expanding radially said material and then depositing it on said support in the form of a sheath; and
   d. while moving said support with said sheath deposited thereon towards the exit end and through the exit end of the extrusion head guiding and forming the sheath into a compacted coating of predetermined thickness.

2. The process according to claim 1 in which the pressure is sufficient for the plastic material to flow from the front end to the exit end of the apparatus and pull the support on which it is deposited towards said exit.

3. The process according to claim 2 in which the plastic material is a vulcanizable composition and the coating deposited on said support is vulcanized.

* * * * *